March 13, 1945. R. SEIFRIED 2,371,587
TRUING MACHINE
Filed April 20, 1942 2 Sheets-Sheet 1

INVENTOR.
RICHARD SEIFRIED
BY Carlos G. Stratton
ATTORNEY

March 13, 1945.　　　R. SEIFRIED　　　2,371,587
TRUING MACHINE
Filed April 20, 1942　　　2 Sheets-Sheet 2

INVENTOR.
RICHARD SEIFRIED
BY Carlos G. Stratton
ATTORNEY

Patented Mar. 13, 1945

2,371,587

UNITED STATES PATENT OFFICE 2,371,587

TRUING MACHINE

Richard Seifried, Inglewood, Calif., assignor to North American Aviation, Inc., Inglewood, Calif., a corporation of Delaware Application April 20, 1942, Serial No. 439,665

11 Claims. (Cl. 153—48)

My invention relates to extrusion reshaping machines. Various metals and plastics are formed by extrusion or by analogous processes into lengths of material having a uniform cross section of predetermined shape, that is, the cross section may be T-shaped, I-shaped, Z-shaped, U-shaped or various modifications thereof and is all termed generally a "structural" cross section. Initially, the material is straight or nearly so; however, it is often desirable to bend or curve the material into various forms or to twist the material about its axis, or to modify the cross section of the material or work piece. For example, aluminum alloy extrusions are bent and re-shaped to form frame members of wings or fuselages or other parts of an aircraft.

The present invention is directed to a reshaping machine which is particularly adapted to be used in conjunction with my co-pending applications for Bending and beveling machines Serial Nos. 437,947 and 463,327, filed April 7, 1942, and October 26, 1942, respectively. The machine here considered is employed in part to complete the shaping or forming of a work piece to an exact contour after being preliminarily formed by one of the machines of my co-pending applications. Its more common use is, however, to re-shape the work piece to the form originally obtained by my companion inventions after the work piece has been annealed or normalized to remove any strains or work hardening effects that may have been induced during the original forming operation.

It should be here noted that various metals, such as aluminum and aluminum alloys tend to undergo work hardening and various internal stresses occur when the material is worked or shaped. As these effects are removed the work piece tends to warp or distort to a greater or lesser extent depending upon the extent that the material has been worked or acted upon.

By use of my companion inventions the amount of such work hardening or the amount and extent of internal stress is minimized, but it is necessary that the different work pieces conform to close tolerances so even a slight distortion must be corrected.

My present invention is not, however, limited to use with my companion inventions but may be used to complete the shaping or reshaping after normalizing or annealing operations of work pieces which have been formed by hand.

Accordingly, among the objects of my invention are:

To provide a machine for reshaping extrusions to close tolerances, thereby lending itself to the mass production of duplicate shapes which are interchangeable.

To provide a machine for reshaping extrusions wherein the work piece is subjected to a minimum amount of re-stressing and this of a uniform nature so that localized stresses are not again established in the work piece and additional work hardening is avoided, thereby eliminating the need of further annealing or normalizing.

To provide a machine of this nature which incorporates a novely arranged forming means which may be utilized in conjunction with other elements of my companion applications in the initial forming of the work piece.

To provide an extrusion reshaping machine whereby the original cross section of the work piece may be maintained or modified as desired; that is, the cross portion of a T-shaped or U-shaped extrusion, or other structural shape, may be maintained in its original angular relation with the stem or legs of the T or U or the angular relation may be modified as desired.

To provide a machine of this character which utilizes forming members that may be readily and economically manufactured and furthermore be readily and quickly interchanged so that work pieces having a wide variety of shapes may be produced and the use of the machine justified even though only a limited number of pieces of each shape are required.

The invention also comprises novel details of construction and novel combinations and arrangements of parts, which will more fully appear in the course of the following description. However, the drawings merely show and the following description merely describes two embodiments of the present invention, which is given by way of illustration or example only.

In the drawings, like reference characters designate similar parts in the several views.

The work piece W upon which my machine operates is an elongated strip having a structural cross section; that is, it may be T-shaped, I-shaped, U-shaped, Z-shaped in cross section or various modifications thereof. Material having a structural cross section, particularly when formed of the softer metals such as aluminum or copper or their alloys or those formed of plastics are usually produced by an extrusion process and are generally referred to as "extrusions" even though they may not have been formed by a true extrusion process; therefore, the term "extrusion" is used broadly for a material of structural cross section whether produced by an extrusion process or otherwise.

By way of example, a work piece W which has been made bow-shaped by one of my companion inventions or otherwise is shown. A T-shaped cross section is shown comprising a stem W1 and a cross portion W2, and a U-shaped cross section U is shown comprising leg members U1.

My machine includes a work table 1 which is flat and upon which is mounted in Sheet I of the drawings, a pair of complementary forming segments 2 in the form of flat blocks set edge to edge. These may be made from hardwood or a combination of hardwood and metal. Their outer or forward and side edges constitute working or forming faces 3. Inasmuch as the work piece is bow-shaped, the combined contour of the working faces is likewise bow-shaped. The working faces are provided with a peripheral slot 4 to accommodate the stem W1 of the work piece while the cross portion W2 lies against the work faces bordering the slot.

Figure 1:
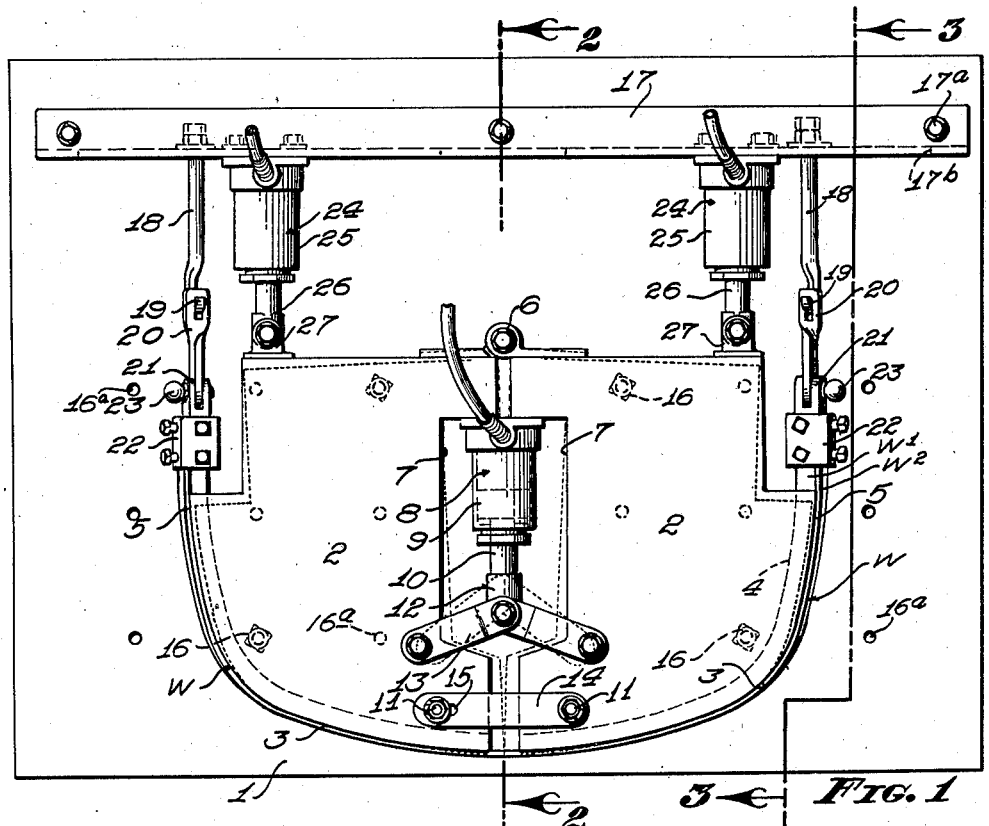
Fig. 1 is a plan view of one form of my machine, showing by solid lines its final position and by dotted lines its initial position.
Figure 2:
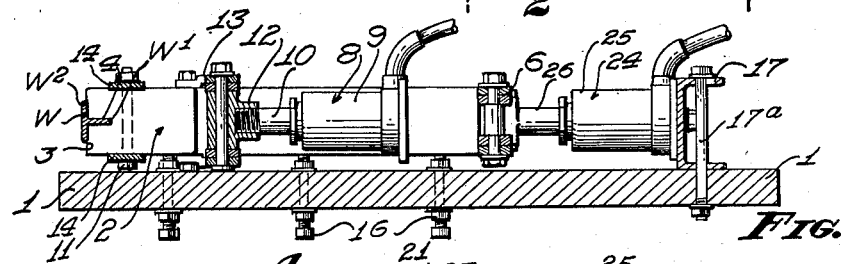
Fig. 2 is a transverse sectional view through 2—2 of Fig. 1.
Figure 3:
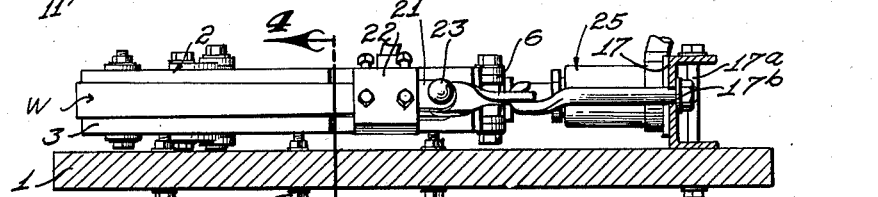
Fig. 3 is a transverse sectional view through 3—3 of Fig. 1.
Figure 4:
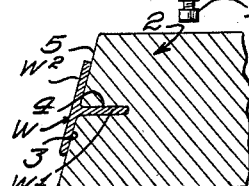
Fig. 4 is an enlarged fragmentary sectional view through 4—4 of Fig. 3 showing particularly the manner in which the normal section of the work piece may be varied in the same or different work material.
Figure 5:
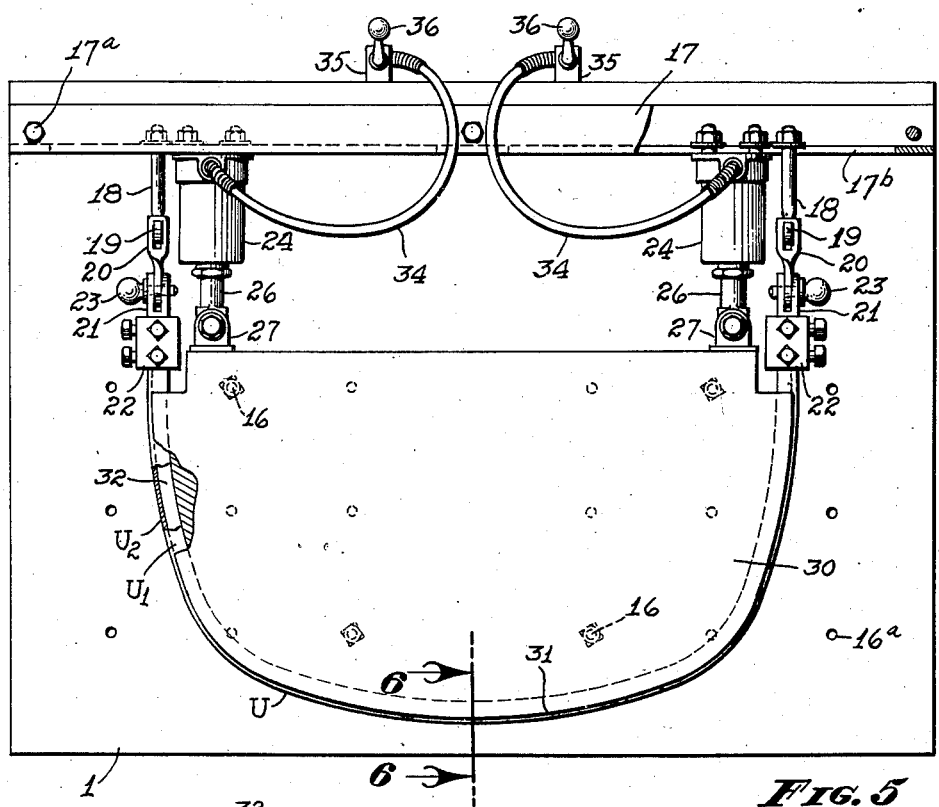
Fig. 5 is a plan view of a modified construction of my machine.
Figure 6:
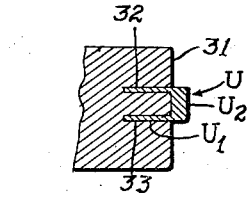
Fig. 6 is an enlarged section taken on the line 6—6 of Fig. 5.

The work faces 3 are contoured transversely to define the angular relation of the cross portion W2 of the work piece; that is, the work face may, at the adjacent ends of the forming segments, be at right angles to the slot 4 as in Fig. 6, or may be beveled as indicated by 5 in Figs. 1 and 4, or the same segment may have both right angled and beveled work face portions.

The rear adjacent corners of the forming segments 2 are joined by a hinge member 6 so that the forward and adjacent corners may be moved to or from each other; that is, may be spread from the dotted line to the solid line position shown in Fig. 1.

The adjacent edges of the forming segments are provided with complementary clearance slots 7. Within the space defined by these slots is an expander jack 8. The jack may be a mechanically operated screw jack, or preferably a hydraulic jack comprising a cylinder 9 which bears against the base or rear extremeties of the slot 7 and piston from which extends a stem 10.

The stem extends forwardly and is provided with a head member 12 to which is pivoted the knee of a toggle joint 13. The toggle joint comprises toggle bars which diverge from the head member above and below the two forming segments and their extremities are anchored or pivoted thereto so that reciprocal movement of the stem 10 moves the forward extremities of the forming segments to or from each other. The forward confronting portions of the forming segments 2 are tied together top and bottom by tie plates 14 through which extends bolts 11, a slot 15 in one end of each tie plate permits the movement of the forming segments about the hinge 6. The forming segments are spaced from the table 1 by spacer bolts 16 adapted to be adjustably extended through selected holes 16a in the table 1.

The rear edges of the forming segments are straight and substantially coplanar. Rearwardly of the forming segments is secured by bolts 17a an anchor bar 17 which may be in the form of a channel iron. The anchor bar extends full width of the table. Longitudinal slots 17b are provided therein to receive anchor bolts 18 which are located so that their axes are tangent to the rearward extremities of the forming faces 4.

The forward extremities of the anchor bolts form hooks 19 which receive loops provided in links 20. The links, in turn, are hinged to bifurcated ends 21 of clamps 22 by means of removable journal pins 23. The normal axis of the journal pins is preferably transverse to the plane of the working faces, while the anchor bolts are free to turn about their longitudinal axes so as to provide a universal movement. The clamps 22 are provided with suitable means to grip the extremities of the work piece.

Between the rear edges of the forming segments and the anchor bar 17 are interposed tension jacks 24 which are adapted to move the forming segments bodily to and from the anchor bar 17. The tension jacks may be similar to the expander jack 8; that is, they may be hydraulic jacks comprising cylinders 25 containing pistons from which extend stems 26. The cylinders may be secured to the anchor bar 17, while the stems may be journaled in brackets 27 secured to the rear outer corners of the forming segments.

The expander jack and tension jacks are connected to a source of fluid pressure through suitable pressure control means, so that the forces that they exert may be regulated or controlled.

In the form shown on Sheet II of the drawings, a single block 30 is slidably mounted upon the bolts 16 that project upwardly above the top surface of the table 1. The outer or forward and side edges of the block 30 constitute working or forming faces 31. The working faces are provided with parallel peripheral slots 32 and 33 to accommodate both legs U1 of the work piece U, while the bridging member U2 of the U-shaped work piece lies against the work faces between the slots.

Conduits 34 connect the cylinders 24 with hydraulic pumps 35. Pump lever arms 36 provide manual means for actuating the pumps 35.

Operation of my extrusion reshaping machines is as follows:

After a work piece has been bent approximately to the required shape by other means, such as hand shaping or by use of one of the machines disclosed in my companion applications, and after the work piece has been annealed or normalized to relieve any stresses, the work piece has approximately the contour of the forming segments or the single forming block 30. It is fitted as closely as possible against the working faces of the forming segments or block and its ends secured in the clamps 22. The links 20 are then looped over the hooks 19. This is done when the forming segments are in approximately the relative positions shown by dotted lines in Fig. 1.

After securing the work, the tension jacks 24 are operated, such as by pumps 35, or other suitable means, to push the forming segments 2 or block 30 bodily forward and thereby pull the ends of the work piece. In the form shown on Sheet I of the drawings simultaneously with or before or after operation of the tension jacks 24, the expander jack 8 is operated to spread the forward adjacent corners of the forming segments. The original position of the segments 2 is shown in dotted lines, while positions to which they may be moved by the expander jack 8 are shown by full lines in Fig. 1.

The work piece is drawn, by the action of the tension jacks 24 (and in Sheet I also by the expander jack), tightly against the forming block or segments with the stem or legs of the work piece fitting into the slot or slots. The work piece is stretched lengthwise slightly, which causes it to retain the contour of the forming block or blocks when released. While only one or two forming segments or blocks are illustrated, it is obvious that three or more segments may be utilized, depending upon the size of the work piece.

While I have illustrated and described what I now regard as the preferred embodiments of my invention, the construction is, of course, subject to modifications without departing from the spirit and scope of my invention. I, therefore, do not wish to restrict myself to the particular forms of construction illustrated and described, but desire to avail myself of all modifications that may fall within the scope of the appended claims.

Having thus described my invention, what I claim and desire to secure by Letters Patent is:

1. In a reshaping machine for an elongated work piece having a structural cross section: a work table; at least a pair of forming segments in the form of flat blocks adapted to lie and slide flatwise on the work table and having complementary, curved work faces adapted to receive said work piece; anchoring means fixed on the table, means carried by said anchoring means and engageable with the extremities of said work piece and movable tangential to said work faces to apply tension to said work piece and draw said work piece against said work faces; adjustable braces between said anchoring means and said forming segments, and means for spreading the work faces of said forming segments with respect to each other to apply tension to intermediate portions of said work piece.

2. In a reshaping machine for an elongated work piece having a structural cross section: a frame, at least a pair of forming segments incorporating complementary work forming edges having therein alined longitudinal channels to receive a portion of said work piece, and having work faces confronting said channels for engagement by other portions of said work piece; anchoring means for the work piece on the frame independent of the forming segments and engageable with the extremities of said work piece for applying tension thereto; adjustable braces between said anchoring means and the forming segments, and means for spreading the work faces of said forming segments for applying tension to said work piece intermediate its extremities.

3. In a reshaping machine for an elongated work piece having a structural cross section; a work table; a forming means adapted to lie on the work table in movable relation thereto and having a curved work face adapted to receive said work piece; anchoring means fixed on the table, adjustable braces between the anchoring means and said forming means, means carried by said anchoring means and engageable with the extremities of said work piece and movable tangential to said work face and substantially parallel with the work surface of said table, to apply tension to said work piece and draw said work piece against said work face.

4. A shaping machine for an elongated work piece having a structural cross section, comprising a frame, forming means having a work face defining the contour of the finished work piece, stationary anchor means on the frame independent of said forming means, clamping elements fastened to said anchor means and adapted to secure the ends of a work piece disposed around said work face, and mechanism for moving said forming means relatively away from said anchor means, said mechanism being pivotally connected with at least one of said means, whereby the forming means equalizes tension applied to the work piece.

5. A shaping machine for an elongated work piece having a structural cross section, comprising a frame, at least a pair of complementary forming segments hinged together and together defining the contour of the finished work piece, anchoring means on the frame independent of the forming segments and engageable with the extremities of the work piece for anchoring same, means effective between said anchoring means and each of the forming segments for moving the latter relatively away from the anchoring means, and means to pivotally move at least one of the segments bodily without distortion thereof and with respect to another segment, by means of the hinged connection, to apply tension to the work piece intermediate its extremities.

6. A shaping machine for an elongated work piece having a structural cross section, comprising forming means having a work face defining the contour of the finished work piece, the work face having varying angular relation with the perpendicular, anchoring means on the frame spaced from the forming means universal means extending from the anchoring means and engageable with the extremities of said work piece, permitting varying angular relation of the work piece, and mechanism at spaced points between the anchoring means and the forming means for moving the forming means forcibly into the loop formed by the work piece, to shape same.

7. A shaping machine for an elongated work piece having a structural cross section, comprising plural segmental forming means, the segments together having a work face defining the contour of the finished work piece, anchoring means engageable with the extremities of the work piece for anchoring same, means between the anchoring means and each segment for individually moving the segments relatively away from the anchoring means, and means connected to move the segments individually with respect to each other, to apply tension to the work piece intermediate its extremities.

8. A shaping machine for an elongated work piece having a structural cross section, comprising a frame, plural segmental forming means, the segments together having a work face defining the contour of the finished work piece, anchor means on the frame independent of said forming means, clamping elements fastened to said anchor means and adapted to secure the ends of a work piece disposed around said work face, adjustable braces between said segments and the anchor means, and means opposed to said braces and connected to move the segments individually with respect to each other, to apply tension to the work piece intermediate its extremities.

9. A shaping machine for an elongated work piece having a structural cross section, comprising a frame, segmental forming means, the segments together having a work face defining the contour of the finished work piece, anchor means on the frame independent of said forming means and engageable with the extremities of the work piece for anchoring same, adjustable braces between said anchor means and the segments, toggle means connected with segments of the forming means and arranged to move the segments relative to each other when the toggle is actuated, and mechanism opposed to said braces and connected to actuate the toggle means, to apply tension to the work piece intermediate its extremities.

10. A shaping machine for an elongated work piece having a structural cross section, comprising a frame, segmental forming means, the segments together having a work face defining the contour of the finished work piece, anchor means on the frame independent of said forming means, clamping elements fastened to said anchor means and adapted to secure the ends of a work piece disposed around said work face, pneumatic means braced relative to the anchor means and connected to forcibly, independently move the forming segments into the loop formed by the work piece, and auxiliary pneumatic means connected to move the segments apart, to apply tension within the anchored work piece.

11. In a reshaping machine for an elongated work piece having a structural cross section; a work table; a forming means adapted to lie on the work table in movable relation thereto and having a curved work face adapted to receive said work piece, anchoring means fixed on the table, an adjustable brace between the anchoring means and said forming means, means carried by said anchoring means and engageable with an extremity of said work piece and movable tangential to said work face and substantially parallel with the work surface of said table to apply tension to said work piece and draw said work piece against said work face.

RICHARD SEIFRIED.